(12) United States Patent
Bischel

(10) Patent No.: US 10,571,041 B2
(45) Date of Patent: Feb. 25, 2020

(54) BI-STABLE CHANGEOVER VALVE

(71) Applicant: TAYLOR COMMERCIAL FOODSERVICE INC., Rockton, IL (US)

(72) Inventor: Kevin H. Bischel, Rockton, IL (US)

(73) Assignee: Taylor Commercial Foodservice Inc., Rockton, IL (US)

( * ) Notice: Subject to any disclaimer, the term of this patent is extended or adjusted under 35 U.S.C. 154(b) by 0 days.

(21) Appl. No.: 15/248,524

(22) Filed: Aug. 26, 2016

(65) Prior Publication Data

US 2017/0057805 A1    Mar. 2, 2017

Related U.S. Application Data

(60) Provisional application No. 62/211,610, filed on Aug. 28, 2015.

(51) Int. Cl.
| | | |
|---|---|---|
| *B67D 3/00* | (2006.01) | |
| *A23G 9/28* | (2006.01) | |
| *F16K 27/04* | (2006.01) | |
| *F16K 31/08* | (2006.01) | |
| *F16K 31/06* | (2006.01) | |

(Continued)

(52) U.S. Cl.
CPC ............ *F16K 31/082* (2013.01); *A23G 9/228* (2013.01); *B67D 1/1245* (2013.01); *F16K 27/0263* (2013.01); *F16K 31/0627* (2013.01); *F16K 31/0679* (2013.01); *F16K 37/0033* (2013.01); *B67D 1/07* (2013.01); *B67D 1/0804* (2013.01);

(Continued)

(58) Field of Classification Search
CPC .. F16K 11/044; F16K 27/0263; F16K 31/082; F16K 37/0033; A23G 9/228; B67D 1/1245; B67D 1/07; B67D 1/0804; B67D 2001/0093; B67D 2001/0097
USPC ...... 137/111–113; 222/145.8, 333, 280, 476, 222/58, 63; 251/65
See application file for complete search history.

(56) References Cited

U.S. PATENT DOCUMENTS 3,789,876 A * 2/1974 Kempton ............ F16K 37/0033
137/554
4,247,018 A * 1/1981 Credle ................ B67D 1/1245
137/113

(Continued)

FOREIGN PATENT DOCUMENTS

EP    0598621 A1    5/1994
EP    1450087 B1    12/2007

(Continued)

*Primary Examiner* — Paul R Durand
*Assistant Examiner* — Andrew P Bainbridge
(74) *Attorney, Agent, or Firm* — Stephen J. Leahu; Brinks Gilson & Lione

(57) ABSTRACT

A valve comprises a body having a first inlet, a second inlet, and an outlet. A shuttle is shiftable between: a first position permitting communication between the first inlet and the outlet and blocking communication between the second inlet and the outlet; and a second position permitting communication between the second inlet and the outlet and blocking communication between the first inlet and the outlet. One or more permanent magnets are positioned to bias the shuttle away from a neutral position between the first position and the second position, wherein the valve further comprises: one or more electromagnets positioned to, in at least one condition of energization, counter said bias.

20 Claims, 6 Drawing Sheets

(51) Int. Cl.
   *F16K 11/07*   (2006.01)
   *A47G 19/18*   (2006.01)
   *A23G 9/22*    (2006.01)
   *F16K 27/02*   (2006.01)
   *B67D 1/12*    (2006.01)
   *F16K 37/00*   (2006.01)
   *B67D 1/00*    (2006.01)
   *B67D 1/07*    (2006.01)
   *B67D 1/08*    (2006.01)

(52) U.S. Cl.
   CPC ........... *B67D 2001/0093* (2013.01); *B67D 2001/0097* (2013.01)

(56) References Cited

U.S. PATENT DOCUMENTS

| | | | |
|---|---|---|---|
| 4,275,823 A | | 6/1981 | Credle, Jr. |
| 4,467,941 A | * | 8/1984 | Du ................ B67D 1/10 222/1 |
| 4,658,988 A | * | 4/1987 | Hassell ........... B67D 1/0021 137/607 |
| 4,674,526 A | | 6/1987 | Athanassiu |
| 4,827,831 A | * | 5/1989 | Hartley .............. F01B 31/02 137/625.27 |
| 5,405,050 A | * | 4/1995 | Walsh ............... B67D 3/043 222/1 |
| 5,470,043 A | * | 11/1995 | Marts ................ F16K 31/082 251/129.01 |
| 5,909,825 A | * | 6/1999 | Lydford ............. B67D 1/0871 116/110 |
| 6,705,346 B2 | | 3/2004 | Kordon |
| 6,837,257 B2 | * | 1/2005 | Cedergren ............. F16K 31/08 137/113 |
| 6,899,314 B2 | | 5/2005 | Ott |
| 7,044,336 B2 | | 5/2006 | Bertone |
| 7,140,393 B2 | * | 11/2006 | Sheydayi ............ F16K 11/044 137/625.44 |
| 8,424,723 B2 | | 4/2013 | Doelman et al. |
| 8,540,208 B2 | * | 9/2013 | Alvarez ............. F16K 31/0658 137/625.65 |
| 2009/0008583 A1 | * | 1/2009 | Grethel ............. F15B 13/086 251/65 |
| 2010/0252114 A1 | * | 10/2010 | Hoffmann ........... F15B 13/044 137/1 |
| 2011/0278322 A1 | * | 11/2011 | Reynolds ........... A47K 5/1202 222/1 |
| 2017/0057805 A1 | * | 3/2017 | Bischel ............... F16K 31/082 |
| 2017/0146150 A1 | * | 5/2017 | Tuskes ............... F16K 31/082 |

FOREIGN PATENT DOCUMENTS

| | | |
|---|---|---|
| EP | 2587496 B1 | 6/2014 |
| GB | 2415952 B | 9/2008 |
| WO | 2006013715 A1 | 2/2006 |

\* cited by examiner

BI-STABLE CHANGEOVER VALVE

CROSS-REFERENCE TO RELATED APPLICATION

Benefit is claimed of U.S. Patent Application No. 62/211,610, filed Aug. 28, 2015, and entitled "Bi-Stable Changeover Valve", the disclosure of which is incorporated by reference herein in its entirety as if set forth at length.

BACKGROUND

The disclosure relates to the food service industry. More particularly, the disclosure relates to changeover valves for switching between two pouches or bags of foodstuff.

In the food service environment, it has become common for foodstuffs such as condiments, beverage syrups, dairy mixes, and the like to be dispensed from flexible containers such as plastic pouches or bags. Exemplary dispensing apparatus include condiment bar consoles, beverage machines, frozen dessert machines, and the like. The foodstuff may be drawn out of the pouch or bag (hereafter simply pouch) via a manual or automated pump.

To extend operation and provide foodstuff delivery continuity, it is known for such dispensing systems to include provisions for connecting two pouches of any given foodstuff and provide a changeover when one pouch empties. In one baseline system, one or more valves control communication between the pouches and the pump. In one example, flow paths from the respective pouches merge into a trunk passing through a pump to the dispenser outlet. A valve may be located along each of the two branches. An exemplary valve is a solenoid pinch valve operating on plastic tubing. In an initial situation, the first pouch is in the process of use and its associated valve is open; whereas the second pouch is full awaiting use and its associated valve is closed. During use, the pump eventually empties the first pouch whereupon further pumping is resisted and pressure in the trunk and first flowpath drops. This condition may be sensed via a pressure sensor, vacuum sensor, or vacuum switch along the trunk or first flowpath or may be sensed via pump current draw. Upon sensing this condition, a switchover is initiated wherein the dispenser's controller closes the first valve and opens the second valve. The opening of the second valve allows the pump to draw foodstuff from the second pouch. The closing of the first valve allows a user to replace the first pouch to facilitate a subsequent switchover from the second pouch to the replaced first pouch and so on.

U.S. Pat. No. 6,837,257, to Cedergren, Jan. 4, 2005, provides an automatic switchover via the use of a bi-stable magnetic shuttle valve. The shuttle has a first condition permitting communication along the first flowpath between the first pouch and the outlet while blocking communication along the second flowpath from the second pouch. Similarly, the shuttle has a second position in which the communication along the first flowpath from the first pouch is blocked and communication along the second flowpath from the second pouch is permitted. Two permanent magnets create a bi-stable relationship between the two positions. Pressure changes associated with the first pouch reaching essentially empty will overcome the magnetic bias and draw the shuttle toward the second position. The bi-stability will cause the shuttle to shift via a toggle action into the second position so that the foodstuff will begin to dispense from the second pouch and the first pouch may be replaced. Again, this process may alternate. This purely permanent magnet valve lacks controllability of electromagnetic valves.

SUMMARY

One aspect of the disclosure involves a valve comprising a body having a first inlet, a second inlet, and an outlet. A shuttle is shiftable between: a first position permitting communication between the first inlet and the outlet and blocking communication between the second inlet and the outlet; and a second position permitting communication between the second inlet and the outlet and blocking communication between the first inlet and the outlet. One or more permanent magnets are positioned to bias the shuttle away from a neutral position between the first position and the second position, wherein the valve further comprises: one or more electromagnets positioned to, in at least one condition of energization, counter said bias.

In one or more embodiments of any of the foregoing embodiments, a shift of the shuttle between the first position and the second position comprises a linear shift.

In one or more embodiments of any of the foregoing embodiments, the one or more permanent magnets comprise a first permanent magnet biasing the shuttle toward the first position and a second permanent magnet biasing the shuttle toward the second position.

In one or more embodiments of any of the foregoing embodiments, the first permanent magnet is a ring and the second permanent magnet is a ring.

In one or more embodiments of any of the foregoing embodiments, the one or more electromagnets comprise a first electromagnet and a second electromagnet.

In one or more embodiments of any of the foregoing embodiments, at least one position sensor is positioned to detect the position of the shuttle.

In one or more embodiments of any of the foregoing embodiments, a food or beverage dispensing apparatus comprising: the valve; a dispensing outlet; a pump between the valve outlet and the dispensing outlet; a first fitting for coupling a first pouch to the first inlet; and a second fitting for coupling a second pouch to the second inlet.

In one or more embodiments of any of the foregoing embodiments, the apparatus further comprises a controller having programming to: receive identifying information for said first pouch and said second pouch; and responsive to the identifying information, energize the at least one electromagnet so as to maintain a net bias on the shuttle different from the bias applied by the one or more permanent magnets.

In one or more embodiments of any of the foregoing embodiments, the apparatus further comprises a refrigeration system.

In one or more embodiments of any of the foregoing embodiments, the apparatus is a beverage dispensing apparatus and further comprises a water inlet connectable to a water source and coupled to a flowpath between the valve and the dispensing outlet.

In one or more embodiments of any of the foregoing embodiments, the apparatus is a condiment dispensing apparatus wherein the dispensing outlet is along a spout.

In one or more embodiments of any of the foregoing embodiments, a method for using the valve or food dispensing apparatus comprises energizing the at least one electromagnet so as to overcome the bias and shift the shuttle from one of the first position and the second position to the other.

In one or more embodiments of any of the foregoing embodiments, the method further comprises energizing the at least one electromagnet so as to resist the bias and allow a pressure difference to shift the shuttle from one of the first position and the second position to the other.

In one or more embodiments of any of the foregoing embodiments, the method further comprises energizing the at least one electromagnet so as to supplement the bias.

In one or more embodiments of any of the foregoing embodiments, a method for using the valve or food dispensing apparatus comprises energizing the at least one electromagnet so as to maintain a net bias on the shuttle different from the bias applied by the one or more permanent magnets.

Another aspect of the disclosure involves a valve comprising: a body having a first inlet, a second inlet, and an outlet. A shuttle is shiftable between: a first position permitting communication between the first inlet and the outlet and blocking communication between the second inlet and the outlet; and a second position permitting communication between the second inlet and the outlet and blocking communication between the first inlet and the outlet; and one or more permanent magnets positioned to bias the shuttle away from a neutral position between the first position and the second position. At least one position sensor is positioned to detect the position of the shuttle.

In one or more embodiments of any of the foregoing embodiments, the at least one position sensor is a non-contact position sensor.

In one or more embodiments of any of the foregoing embodiments, the non-contact position sensor is a Hall-effect sensor or a magnetic reed switch.

In one or more embodiments of any of the foregoing embodiments, the shuttle comprises a first projection at a first end and second projection at an opposite second end. The at least one position sensor comprises a first position sensor positioned to interact with the first projection and a second position sensor positioned to interact with the second projection.

In one or more embodiments of any of the foregoing embodiments, a food or beverage dispensing apparatus comprises: the valve; a dispensing outlet; a pump between the valve outlet and the dispensing outlet; a first fitting for coupling a first pouch to the first inlet; and a second fitting for coupling a second pouch to the second inlet.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
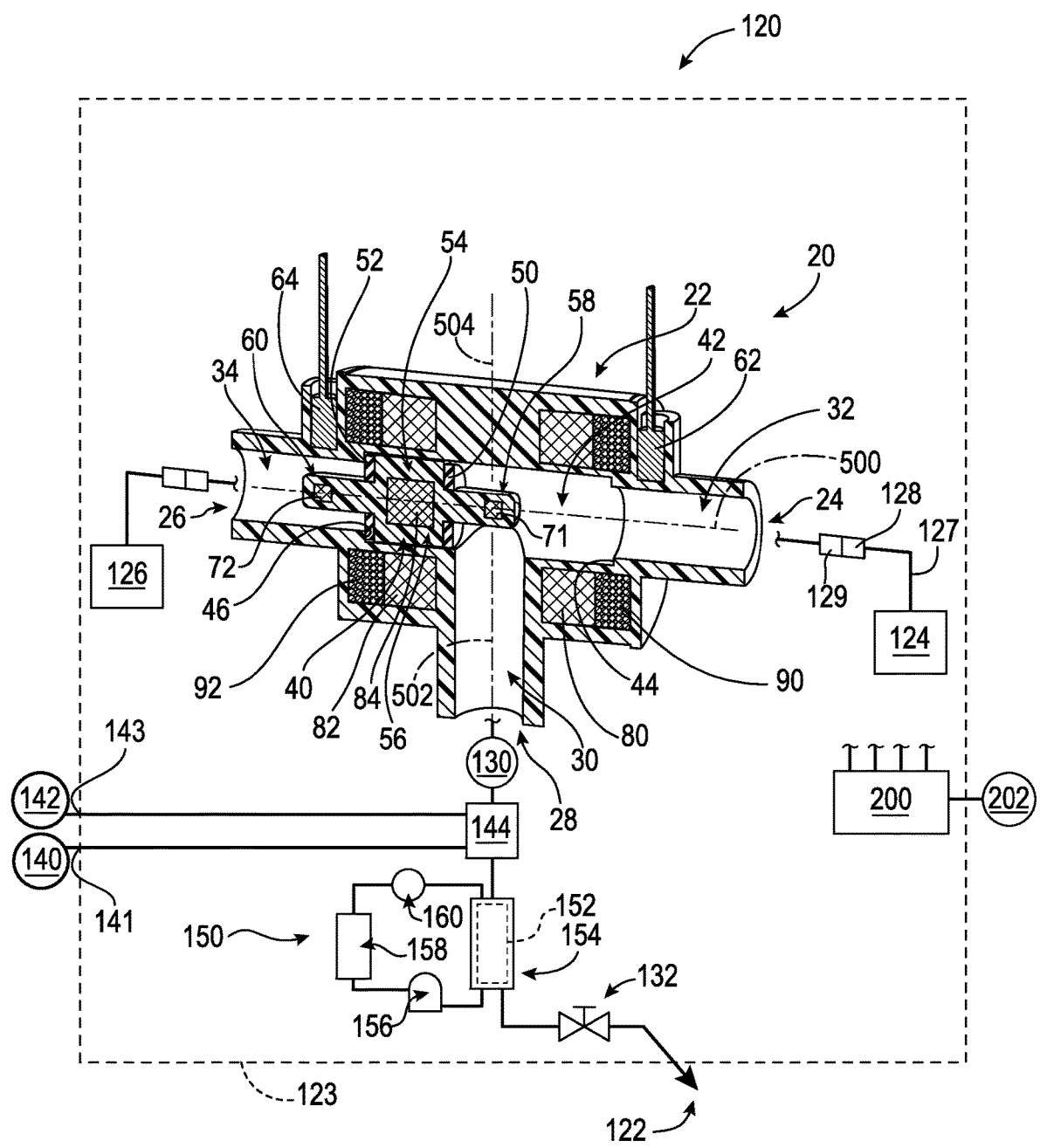
FIG. 1 is a partially schematicized view of a food service system with valve cut away and in a first condition.

FIG. 1 shows valve 20 that combines aspects of a bi-stable permanent magnet valve such as that of U.S. Pat. No. 6,837,257 (the '257 patent), with an electromagnetic control. The valve has a body or housing 22 having a first inlet 24, a second inlet 26, and an outlet 28. The exemplary valve internal passageways are arranged as a T with: the outlet at the distal end of a leg 30 of the T; and the respective inlets at distal ends of arms 32 and 34 of the T. Alternative constructions may have ports in different orientations (e.g. a Y-configuration or otherwise). The exemplary arms are coaxial along an axis 500 diverging from an intersection with the leg (shown having an axis 502 within a transverse centerplane 504 of the valve).

The valve element or shuttle 40 is captured within a channel 42 formed by proximal portions of the arms. The channel 42 extends from a first shoulder 44 to a second shoulder 46. The shoulders 44 and 46 form sealing surfaces and mechanical stops for the shuttle.

The exemplary shuttle has respective seals 50, 52 at opposite ends of a main body 54 for sealing with the respective shoulders. Exemplary seals are rubber, elastomer, or the like and positioned to engage the respective shoulders in respective conditions. An exemplary main body is formed of a plastic such as a food-grade acetyl copolymer An exemplary shuttle main body has a central portion 56 and respective first and second end projections 58 and 60 (e.g., protruding through the associated seal 50, 52). As is discussed below, these projections may interface with respective sensors 62, 64 for determining the position of the shuttle and thus the valve state. In the exemplary embodiment, with the shuttle in the FIG. 1 first position or condition, the valve permits communication through the first inlet 24 and blocks communication through the second inlet 26. The first projection 58 is relatively remote of its associated sensor 62 (and outside operational proximity thereto) and the second projection 60 is relatively close and in operational proximity to its associated sensor 64.

With the shuttle in the second position or condition (FIG. 2), the valve permits communication through the second inlet 26 and blocks communication through the first inlet 24. The second projection 60 is relatively remote of its associated sensor 64 (an outside operational proximity thereto) and the first projection 58 is relatively close and in operational proximity to its associated sensor 62.

Depending upon implementation, there are numerous possible types of sensors 62, 64, including Hall effect sensors, reed switches, optical sensors, and the like. For example, the projections themselves may be directly detected if the body is of an appropriate material or the sensor is of an appropriate type. For example, a magnetized body or body carrying a magnetic insert 71, 72 may be detected by a Hall effect sensor or a reed switch. Alternatively, such sensors may be centered enough to detect a central magnetic insert 84 (discussed below) in a plastic (food grade acetyl copolymer). With a transparent valve body, optical sensors may be used to detect an opaque shuttle whether formed of plastic or other material.

The valve has a pair of respective first and second permanent magnets 80 and 82 which may function in a similar fashion to those of the '257 patent. The exemplary magnets 80 and 82 are rings or toroids and provide a bi-stable default operation similar to that of the '257 patent. The shuttle may be formed of a magnetized material or may carry one or more separate magnets (e.g., a permanent magnet bar or cylinder 84 (FIG. 1) embedded in a molded plastic (e.g., acetyl copolymer) portion of the shuttle main body 54). Thus, in one example, the two exemplary permanent magnet rings 80, 82 have substantially axial polarities axially in the same direction as each other and opposite to an axial polarity of the shuttle or its magnet 84. For example, in FIG. 1, if the south poles of the permanent magnets are to the right (the right faces of the toroids) with the north poles to the left, the north pole of the permanent magnet may be to its right (its right end face) with its south pole to the left. Clearly, all these may be reversed. In the exemplary implementation, the shuttle is approximately axially aligned with one of the permanent magnets when at its end of the shuttle's range of travel. Alternative implementations may involve opposed polarities (e.g., where the shuttle has two magnets of opposed polarities in appropriate positions).

As is discussed above, electromagnetic means comprising one or more electromagnets 90, 92 are added beyond the permanent magnet structure of the '257 patent. Exemplary electromagnets each comprise a metallic wire coil held by the housing circumscribing the axis 500. Exemplary configurations associate first 90 and second 92 electromagnets with the respective end of the housing (on opposite sides of the transverse centerplane 504). The illustrated configuration places each electromagnet coil just axially beyond its associated permanent magnet. However, other positional relationships (e.g., including reversal and radial offset) are possible.

The electromagnets may be controlled and powered by control and power electronics 200 receiving power from an external source 202 (e.g., AC wall power). The electromagnets may be connected via leads (not shown) to the control and power electronics.

These electromagnets may offer one or more of several advantages. In one example, without the electromagnets energized, operation is as is for the '257 patent. The electromagnets may be used, however, to intentionally shift the shuttle to switch the valve from dispensing from one pouch to dispensing from the other before the former has been emptied. To do this, the electromagnets are energized in such a way to overcome the bias from the permanent magnets and shift (toggle) the shuttle to its other position. For example, when the shuttle is closer to one of the permanent magnets, that magnet may dominate. With the two exemplary electromagnets, one of the electromagnets will be closer to the shuttle in one of the positions and the other electromagnet will be closer with the shuttle in the other position. In one example (having independently connected and energizable electromagnets), to cause the shift the controller energizes only the closer magnet by running a current in a direction to create a magnetic field opposed to the magnetic field of the dominant magnet. This current may be applied in a quick pulse of predetermined duration as effective so that a net magnetic force during the duration can toggle the shuttle to the opposite position.

In the exemplary implementation where both permanent magnets have the same polarity, an alternative is for the controller to energize both electromagnets to provide a magnetic field opposed to the field of the permanent magnets. This implementation has an advantage of symmetry in that the same pulse may be applied to the electromagnets regardless of which position the shuttle is in. Thus, the system does not need to be configured to sense shuttle position and the controller does not need to be configured to act based upon shuttle position. If the pulse duration is too long, it may end up producing a counteracting force as the shuttle moves sufficiently far. In such a situation, the controller is configured so that the pulse is strong enough yet short enough to impart sufficient momentum to effect the shift while not remaining on long enough to counter the shift. In some of those implementations, the electromagnets may be electrically in series or parallel or may be independent.

There are a number of circumstances in which the intentional shift may be desired. For example, it might be desired to replace both pouches with a different foodstuff or, one pouch may have reached an expiration. Other overrides involve cleaning wherein one or both pouches are replaced with sources of cleaning fluid. The shuttle may be shifted back and forth to clear respective flow paths.

Another operational consideration for the electromagnets is to alter the net bias applied to the shuttle. For example, for different viscosities or textures of foodstuff, different bias forces may be desirable for effective operation. One flavor of syrup may be more viscous than another. One condiment may be more viscous than another or may include solids that alter its flow properties. In such a situation, it may be desired that a greater vacuum or lower pressure be created by the pump in the flowpath before the shuttle switches position to ensure evacuation of all the more viscous liquid product from the pouch. The amount of bias force provided by the permanent magnets may, in the design process, be selected to provide a nominal bias force associated with a default foodstuff. If a foodstuff requiring a greater bias force is used, the electromagnets may be energized to augment the bias force. If a foodstuff requiring a lesser bias force is used, the electromagnets may be energized to partially counter the permanent magnet bias force.

Particularly in situations of motor-controlled pumps, the electromagnetic bias force component may be applied only when the motor is running. Thus, for example, with the motor off, the permanent magnet bias force keeps the shuttle in one of its positions. When the dispenser is then to dispense (e.g., a user presses a button or otherwise actuate the dispenser) the dispenser's controller may start by applying the desired electromagnet bias force and then may start the pump. This eliminates the energy loss from maintaining energization of the electromagnets of a purely electromagnetic valve during non-dispensing intervals.

One particular group of examples of a dispenser is a frozen beverage or dessert dispenser such as may dispense frozen beverages, soft serve ice cream, frozen yogurt, and/or shakes. Another group includes condiment dispensers.

FIG. 1 further schematically shows a dispensing system 120 including the valve 20 and further including a dispensing outlet 122. The apparatus may include a housing 123 having compartments for containing the respective first and second pouches 124, 126. The pouches may be connected via appropriate fittings 128 to complementary fittings 129 associated with the valve. One or more forms of conduit 127 (e.g., flexible tubing, rigid conduit, and the like) may intervene in one or more locations between the interiors of the respective pouches and the inlets 24 and 26. In alternative configurations, the pouches may be located externally of the machine (e.g., even in a remote service closet away from the machine).

FIG. 1 further shows a pump 130 and a control valve 132 along a flowpath extending from the valve outlet 28 to the dispensing outlet 122. Again, various lines/conduit fittings, and the like, may be located along this flowpath.

Some exemplary apparatus may merely dispense intact foodstuff from the pouches, alternative versions may involve mixing the foodstuff with one or more additional ingredients such as water or a base foodstuff (e.g., a dessert product base wherein the foodstuff pouch merely adds specific flavoring).

FIG. 1 shows further details of the system 120 as a frozen carbonated beverage (FCB) system. FIG. 1 schematically shows a water source 140 (e.g., building potable water) and a carbon dioxide source 142 (e.g., a remote carbon dioxide tank connected to respective inlets 141, 143). Mixing equipment 144 may be provided for mixing the syrup, water, and carbon dioxide in one or more stages. FIG. 1 shows the system 120 as including a refrigeration system 150 (e.g., shown as a vapor compression system). The refrigeration system includes a heat exchanger 152 along the flowpath between the valve 20 and the outlet 122. In several frozen dessert and frozen beverage situations, the heat exchanger 152 may be formed as a portion of a freezing cylinder 154 (e.g., with the valve 132 being in a door of the freezing cylinder).

In the vapor compression system implementation of the refrigeration system 150, a compressor 156 may drive refrigerant along a recirculating refrigerant flowpath passing sequentially from a discharge port (outlet) of the compressor through a heat exchanger 158 (a heat rejection heat exchanger such as a gas cooler or condenser in the normal cooling mode), an expansion device 160 (e.g., an automatic expansion valve (AXV), a thermal expansion valve (TXV), an electronic expansion valve (EXV), an orifice, or the like), and the heat exchanger 152 before returning to the compressor suction port (inlet).

The controller portion of the control and power electronics 200 may receive user inputs from an input device (e.g., switches, keyboard, or the like) and sensors (not shown, e.g., pressure sensors and temperature sensors at various system locations). The controller may be coupled to the sensors and controllable system components (e.g., valves, the compressor motor, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components. In addition to the programming of a baseline system, the controller may be programmed to carry out the various foregoing functions and modes. This may include receiving identifying information for the pouches and, responsive to the identifying information, energizing the electromagnets so as to maintain the appropriate net bias on the shuttle different from the bias applied by the one or more permanent magnets.

Figure 2:
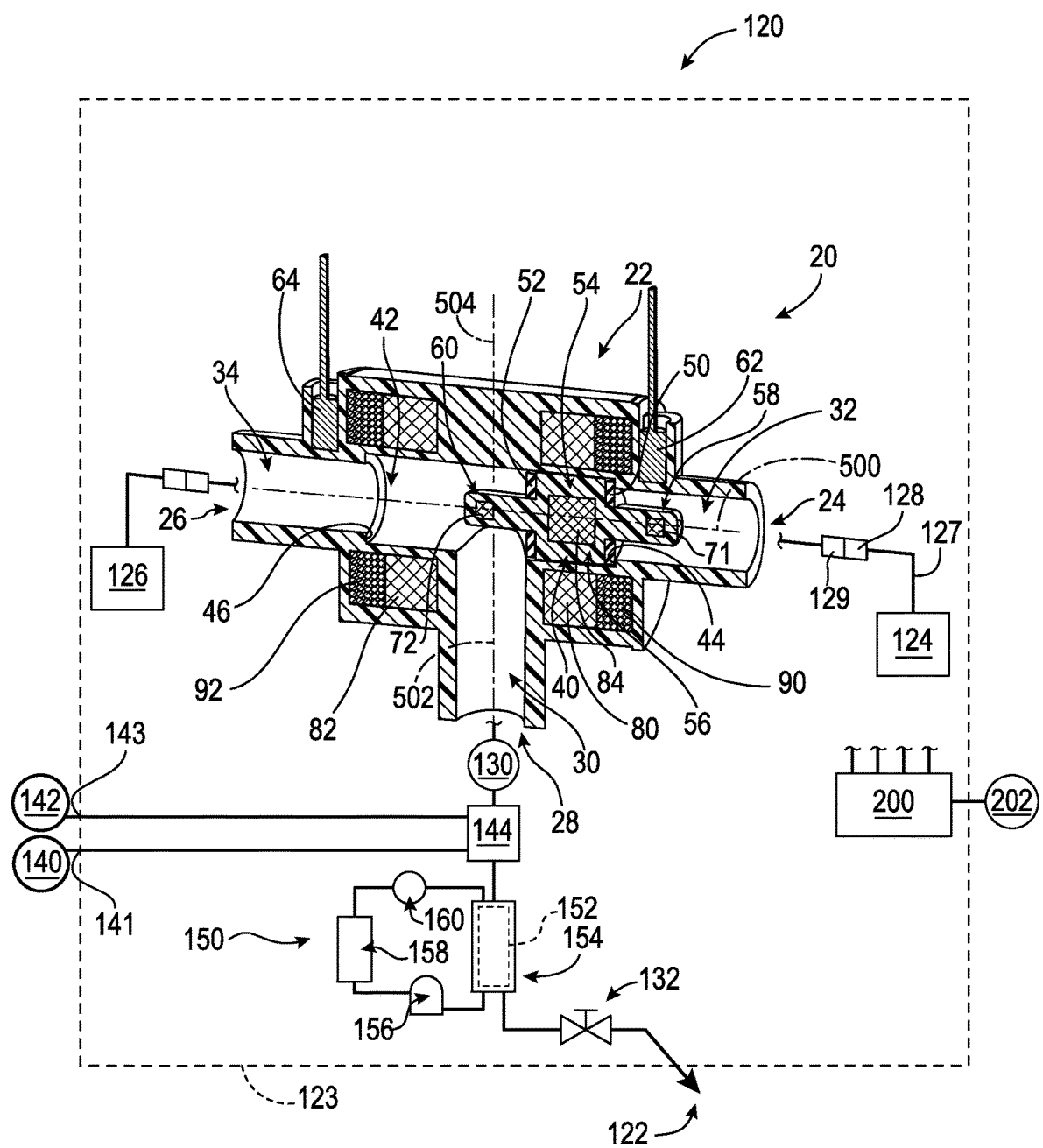
FIG. 2 is a partially schematicized view of the food service system with valve cut away and in a second condition.

In the exemplary FIG. 1 configuration, the electromagnet 92 is located axially outboard/outward of the axial position of the shuttle magnet 84 (e.g., center-to-center) when the shuttle 40 is positioned to seal passageway 34. This is allows the electromagnet 92 to exert an axial bias force on the shuttle in that position. The bias force pulls the shuttle 40 toward the electromagnet 92 and forces the sealing surface 52 of the shuttle 40 against the shoulder 46 of the valve body 22. Similarly, FIG. 2 shows the electromagnet 90 is located axially outboard/outward of the axial position of the shuttle magnet 84 when the shuttle 40 is in the position to seal passageway 32.

Thus, in some implementations, the permanent magnets 80 and 82 might be essentially only responsible for providing a bi-stable or toggle effect but not applying substantial (if any) sealing bias in the sealing positions. The sealing bias could be left to electromagnets.

In other implementations where the permanent magnets 80 and 82 alone can provide axial sealing force at the two sealing positions, the axial centers of the permanent magnets may also be located axially outboard/outward of that of the shuttle magnet 84 when the shuttle 40 is located at the respective associated sealing position. An exemplary center-to-center offset of the shuttle magnet and permanent magnet 80 or 82 is by at least 10% of the axial length or thickness of the permanent magnet 80 or 82 or at least 20% or at least 30%.

The relative axial distance of the electromagnets 90 and 92 from the shuttle magnet 84, the relative axial distance of the permanent magnets from the shuttle magnet, the strength of the electromagnet fields, the strength of the permanent magnet fields, and the strength of the shuttle magnet are design factors that may be used to create the desired axial sealing forces at the sealing positions.

Figure 3:
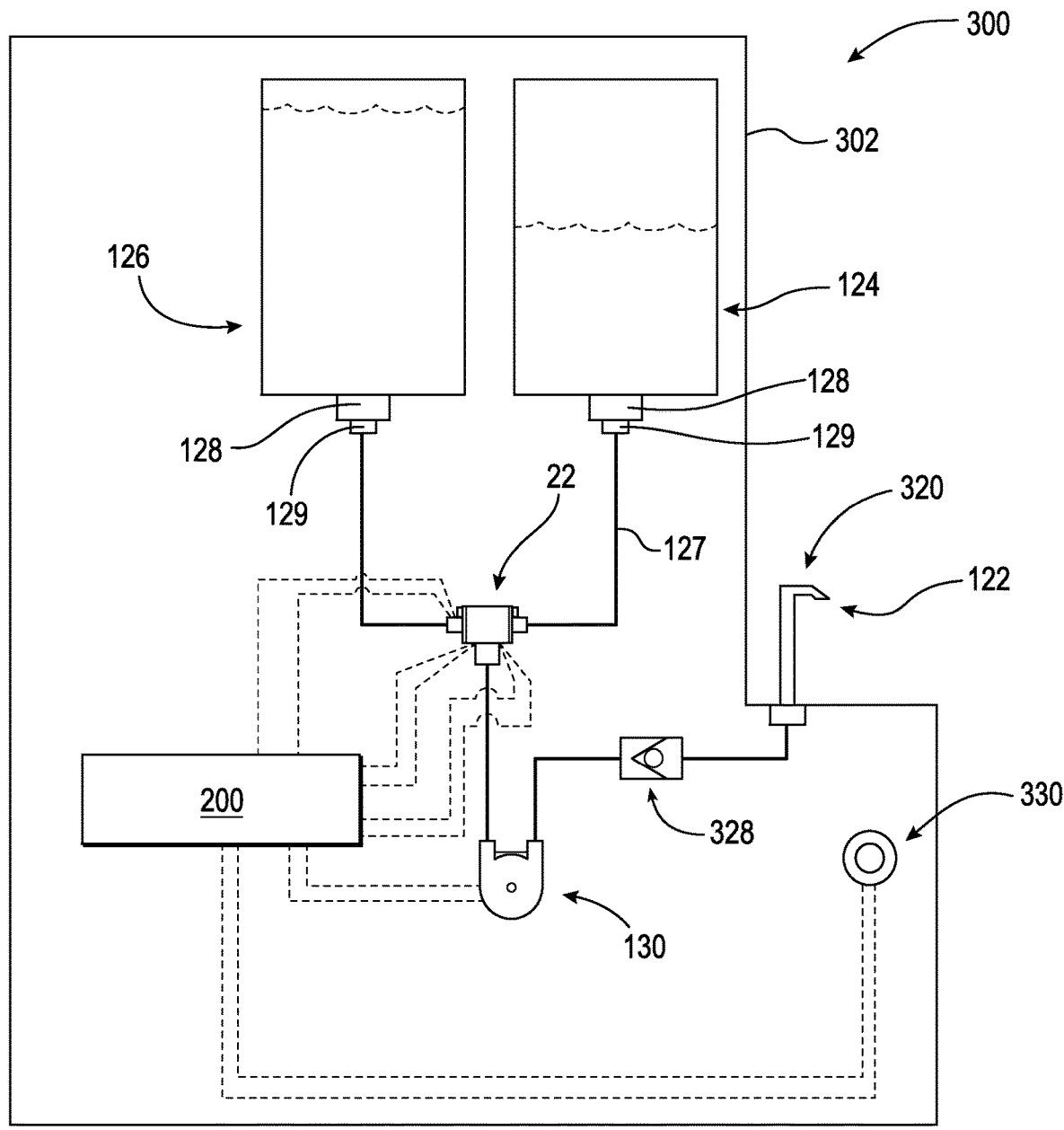
FIG. 3 is a partially schematicized view of a second food service system.

FIG. 3 shows a system 300 as a condiment (e.g., ketchup, mustard, liquid, dessert topping, or the like) dispenser 300 having a housing 302. The exemplary outlet 122 is formed at the end of a dispensing spout 320. In some implementations, the dispensing spout may be integrated with a spring-loaded manual valve such that depressing the spout opens the valve. In other implementations, a push button or other control 330 may be provided for actuating the pump 130 (e.g., an electric motor-driven liquid pump such as a peristaltic pump). FIG. 3 also shows an exemplary check valve 328 located along the flowpath from the pump 130 to the outlet 122.

Figure 4:
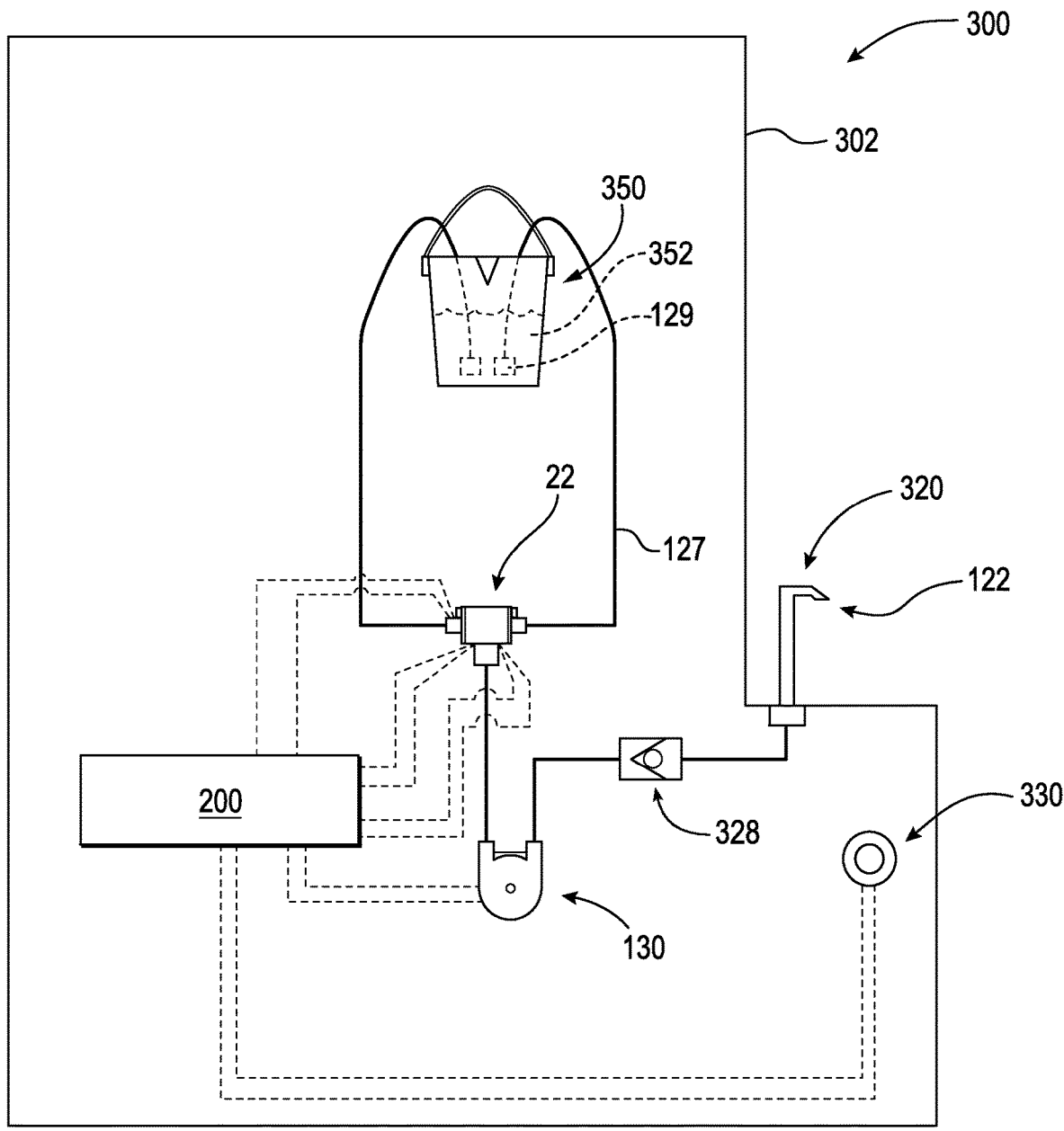
FIG. 4 is a view of the second food service system during a cleaning operation.

FIG. 4 shows the system 300 in a cleaning condition wherein both pouches have been removed and their associated fittings 129 have been immersed in a cleaning solution 352 (e.g., held in a bucket 350 or other container of aqueous cleanings and/or disinfecting solution). The controller may shift the valve as discussed above for cleaning.

Figure 5:
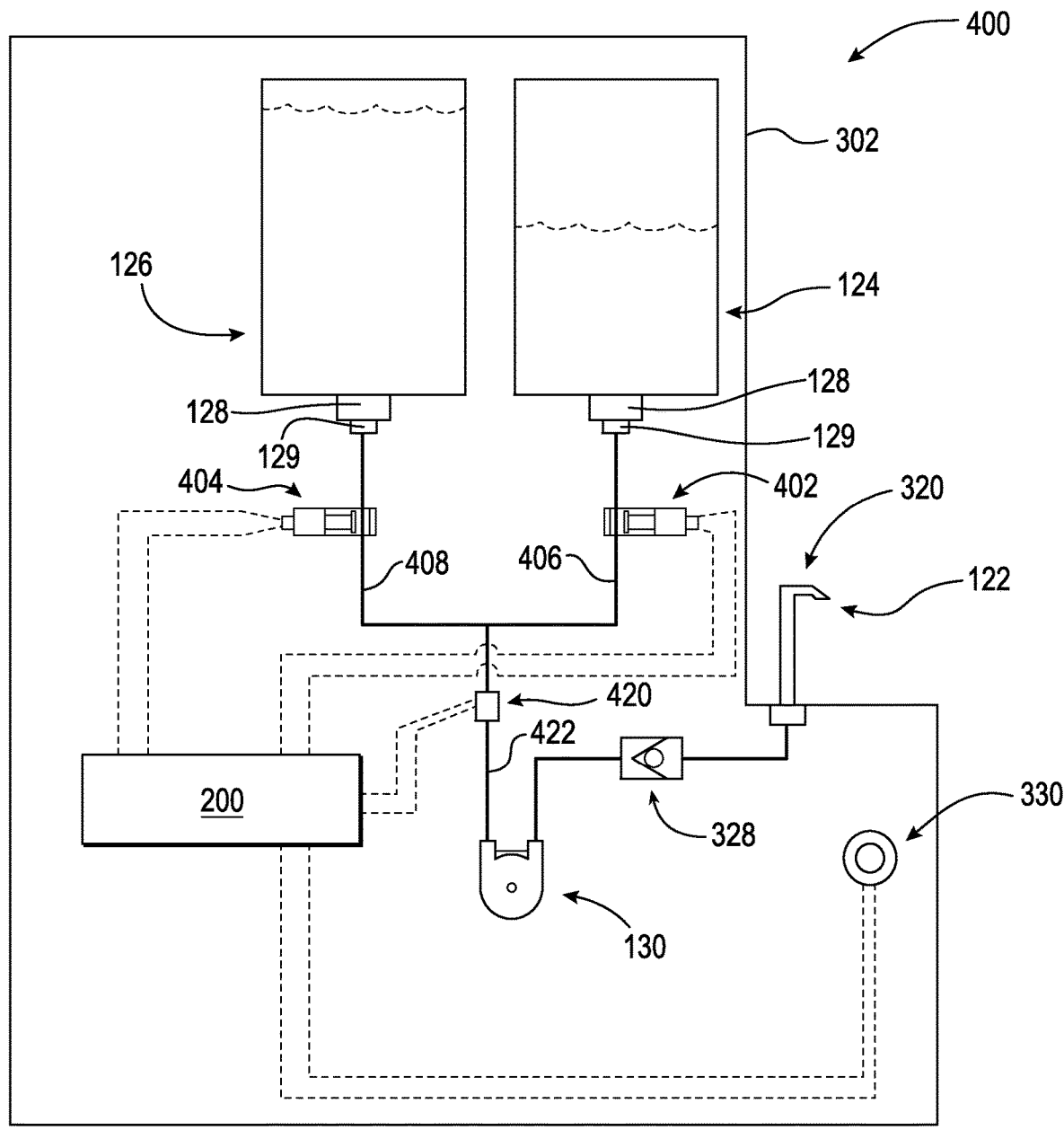
FIG. 5 is a partially schematicized view of a baseline food service system for the second food service system.

FIG. 5 shows an exemplary baseline system 400 from which the system 300 may represent a remanufacture or reengineering. In place of the valve 20, a pair of pinch valves 402, 404 are located along flexible conduits 406, 408 between the fittings 129 and a junction such as a T-fitting or a Y-fitting. A vacuum switch 420 is located along a conduit 422 downstream of the junction and upstream of the pump. As is discussed above, there will normally be one full pouch for which the associated pinch valve is closed and one expending pouch for which the associated pinch valve is open. Upon the pressure at the vacuum switch decreasing to a threshold value, the controller closes the open pinch valve and opens the closed pinch valve to allow product to drain from the formerly full pouch. The controller may signal (such as via a light) that a pouch change is required.

In the system 300 or 400, a refrigeration system may be provided to chill the pouches. In one example, the normal mode heat absorption heat exchanger may be within or along an insulated compartment containing the pouches to chill the compartment and pouches.

Figure 6:
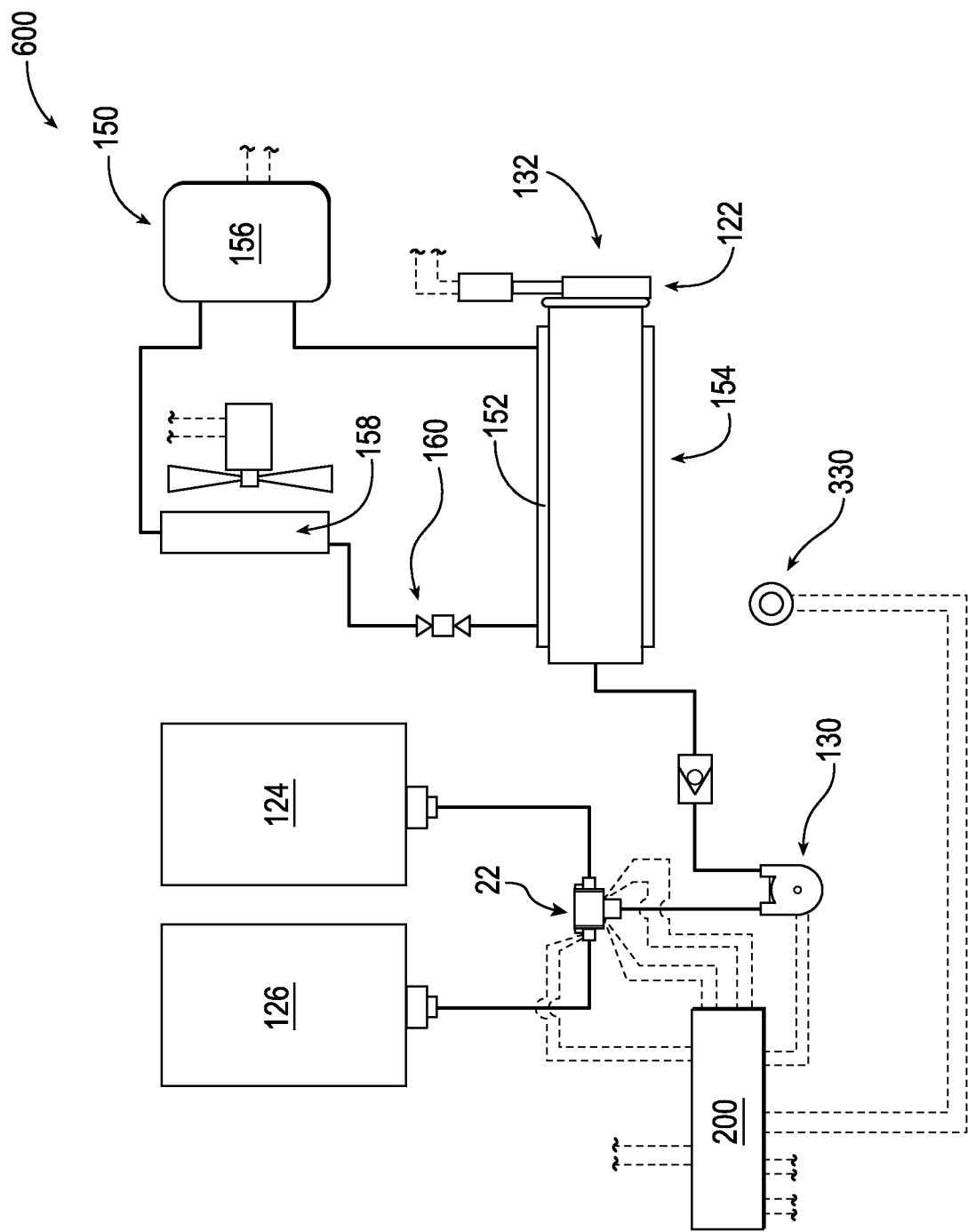
FIG. 6 is a partially schematicized view of a third food service system.

FIG. 6 shows a system 600 as a frozen dessert system (e.g., frozen yogurt or soft-serve ice cream or the like). The pouches may contain the confection in liquid form and may be refrigerated by the same refrigeration system 150 addressing the freezing cylinder 154 or by a separate refrigeration system. Thus, in distinction from the FIG. 1 system, there need not be external inputs of water or carbon dioxide. However, other systems may have external inputs or separate inputs of multiple components. For example, there might be a pair of pouches and an associated shuttle valve for each of several flavors to be added to a dessert base stock. The dessert base stock itself may be contained in two pouches linked via a shuttle valve. Other combinations of features between the different embodiments discussed above are possible as are combinations of features from such embodiments with other existing or yet-developed systems.

The systems may be made using otherwise conventional or yet-developed materials and techniques.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A valve for dispensing foodstuff, comprising:
   a body having a first inlet, a second inlet, a valve outlet, and internal foodstuff passageways, the body formed of a food-grade material, the internal foodstuff passageways configured to permit communication between the inlets and the valve outlet;
   a shuttle shiftable between:
      a first position permitting communication between the first inlet and the valve outlet and blocking communication between the second inlet and the valve outlet; and
      a second position permitting communication between the second inlet and the valve outlet and blocking communication between the first inlet and the valve outlet; and
   one or more permanent magnets positioned to bias the shuttle away from a neutral position between the first position and the second position; and,
   one or more electromagnets positioned to, in at least one condition of energization, counter said bias.

2. The valve of claim 1 wherein:
   a shift of the shuttle between the first position and the second position comprises a linear shift.

3. The valve of claim 1 wherein:
   the one or more permanent magnets comprise a first permanent magnet biasing the shuttle toward the first position and a second permanent magnet biasing the shuttle toward the second position.

4. The valve of claim 3 wherein:
   the first permanent magnet is a ring and the second permanent magnet is a ring.

5. The valve of claim 1 wherein:
   the one or more electromagnets comprise a first electromagnet and a second electromagnet.

6. The valve of claim 1 further comprising:
   at least one position sensor positioned to detect the position of the shuttle.

7. A food or beverage dispensing apparatus comprising:
   the valve of claim 1;
   a dispensing outlet;
   a pump between the valve outlet and the dispensing outlet;
   a first fitting for coupling a first pouch to the first inlet; and
   a second fitting for coupling a second pouch to the second inlet.

8. The apparatus of claim 7 further comprising a controller having programming to:
   receive identifying information for said first pouch and said second pouch; and
   responsive to the identifying information, energize the at least one electromagnet so as to maintain a net bias on the shuttle different from the bias applied by the one or more permanent magnets.

9. The apparatus of claim 8 wherein the net bias allows the sequential dispensing from the first pouch and the second pouch with a pressure drop associated with an emptying of one of the first pouch and second pouch shifts the shuttle to dispense from the other of the first pouch and second pouch.

10. The apparatus of claim 9 wherein the net bias accommodates a viscosity of material in the first pouch and the second pouch.

11. The apparatus of claim 7 further comprising a refrigeration system.

12. The apparatus of claim 7 being a beverage dispensing apparatus and further comprising:
   a water inlet connectable to a water source and coupled to a flowpath between the valve and the dispensing outlet.

13. The apparatus of claim 7 being a condiment dispensing apparatus wherein the dispensing outlet is along a spout.

14. A method for using the apparatus of claim 7, the method comprising:
   energizing the at least one electromagnet so as to maintain a net bias on the shuttle different from the bias applied by the one or more permanent magnets.

15. The method of claim 14 wherein:
   the method is repeated to dispense a plurality of different foodstuffs and wherein the net bias compensates for a viscosity or solids content of the different foodstuffs.

16. The apparatus of claim 7 wherein the valve further comprises:
   at least one position sensor positioned to detect the position of the shuttle.

17. The apparatus of claim 7 further comprising:
   said first pouch and said second pouch, the first fitting coupling the first pouch to the first inlet, the second fitting coupling the second pouch to the second inlet.

18. A method for using the valve of claim 1, the method comprising:
   energizing the at least one electromagnet so as to overcome the bias and shift the shuttle from one of the first position and the second position to the other.

19. The method of claim 18 further comprising:
   energizing the at least one electromagnet so as to resist the bias and allow a pressure difference to shift the shuttle from one of the first position and the second position to the other.

20. The method of claim 18 further comprising:
   energizing the at least one electromagnet so as to supplement the bias.

* * * * *